(12) United States Patent
Shaaia et al.

(10) Patent No.: US 9,871,276 B2
(45) Date of Patent: Jan. 16, 2018

(54) BATTERY CELL COOLING PLATE

(71) Applicant: GM Global Technology Operations LLC, Detroit, MI (US)

(72) Inventors: Robert N. Shaaia, Sterling Heights, MI (US); Roger M. Brisbane, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 667 days.

(21) Appl. No.: 14/453,786

(22) Filed: Aug. 7, 2014

(65) Prior Publication Data

US 2016/0043454 A1    Feb. 11, 2016

(51) Int. Cl.
| | |
|---|---|
| *H01M 8/04* | (2016.01) |
| *H01M 10/6557* | (2014.01) |
| *F28F 3/12* | (2006.01) |
| *F28F 21/06* | (2006.01) |

(52) U.S. Cl.
CPC ........... *H01M 10/6557* (2015.04); *F28F 3/12* (2013.01); *F28F 21/065* (2013.01); *F28F 2265/24* (2013.01); *F28F 2275/025* (2013.01)

(58) Field of Classification Search
CPC ...................................................... H01M 8/04
See application file for complete search history.

(56) References Cited

U.S. PATENT DOCUMENTS

| | | | |
|---|---|---|---|
| 2012/0045682 A1* | 2/2012 | Oury ................. | H01M 10/0525 429/120 |
| 2012/0177970 A1* | 7/2012 | Marchio ............. | H01M 2/0237 429/120 |
| 2013/0101881 A1* | 4/2013 | Syed ................... | H01M 2/1077 429/120 |
| 2013/0108897 A1* | 5/2013 | Christian ............ | H01M 10/625 429/50 |
| 2014/0370368 A1* | 12/2014 | Kaibin ................... | B32B 15/08 429/163 |
| 2015/0111082 A1* | 4/2015 | Sumpf ................. | H01M 2/105 429/120 |

* cited by examiner

*Primary Examiner* — Jacob Marks
(74) *Attorney, Agent, or Firm* — Quinn IP Law

(57) ABSTRACT

A cooling plate design for cooling a battery cell is provided that employs a plastic plate having cutouts for coolant flow paths. The plastic plate has a layer of adhesive film on each side to maintain coolant in the channels. Compression within an alternating battery cell and coolant plate stack provides pressure that minimizes coolant load on the film. Methods to manufacture the cooling plate are also provided.

12 Claims, 2 Drawing Sheets

FIG. 1

BATTERY CELL COOLING PLATE

FIELD OF THE INVENTION

The present technology relates to a cooling plate, including a plastic cooling plate for regulating the temperature of one or more battery cells.

BACKGROUND OF THE INVENTION

This section provides background information related to the present disclosure which is not necessarily prior art.

Electrical systems within vehicles, such as hybrid, electric, and fuel cell vehicles, have advanced in complexity and power usage. Such vehicles can include an electric motor in combination with a battery power source. The battery can power the vehicle alone or can work in conjunction with another power source, such as an internal combustion engine.

High power output and large capacity batteries can be used as a battery power source; e.g., nickel-metal hydride or lithium-ion polymer batteries. A number of battery cells can be connected in series or parallel with each other so as to construct a larger battery assembly. The battery cells can be packaged together with various mechanical and electrical couplings between the battery cells to form the assembly. Various battery cells types, shapes, and sizes exist, including flat, curved or rounded, and cylindrical cells. Battery cells can include prismatic batteries or pouch-shaped batteries that can be placed in a stacked relationship to reduce space and overall size of the assembly. Such battery cells can exhibit changes in one or more dimensions during charging and discharging and over their lifetime, where the battery cells can expand and contract.

Heat can be generated by the battery cells during charging and discharging processes. Accumulation of heat in the battery assembly can impact the performance of the battery cells. Consequently, a cooling system can be provided to maintain a particular operating temperature or temperature range. Such cooling systems can include fluid heat exchangers that operate by moving air over the cells and/or through the use of liquid cooling systems. These cooling systems, however, can present high manufacturing and maintenance costs, and issues may arise due to the relatively high number of parts, including seals and joints needed between cooling system components. In certain cases, it may also be necessary to insulate a cooling fluid from the battery cells and insulate the battery cells from each other.

SUMMARY OF THE INVENTION

The present technology includes systems, methods, and articles of manufacture that include a cooling plate.

In some embodiments, a cooling plate is provided that includes a substantially planar plate, a first film, and a second film. The substantially planar plate has a first surface, a second surface, and a cutout, where the cutout includes an inlet, an outlet, and a flow field between the inlet and the outlet. The first film is coupled to the first surface and the second film is coupled to the second surface. The flow field, the first film, and the second film form at least one conduit that fluidly couples the inlet and the outlet.

In certain embodiments, a method of making a cooling plate is provided that includes cutting a blank to form a substantially planar plate having a first surface, a second surface, and a cutout. The cutout includes an inlet, an outlet, and a flow field between the inlet and the outlet. A first film is applied to the first surface and a second film is applied to the second surface. The flow field, the first film, and the second film form at least one conduit fluidly coupling the inlet and the outlet.

In various embodiments, a method of cooling a battery cell is provided that includes placing a cooling plate according to the present technology in thermal contact with the battery cell. A cooling fluid is circulated through the at least one conduit of the cooling plate.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

Figure 1:
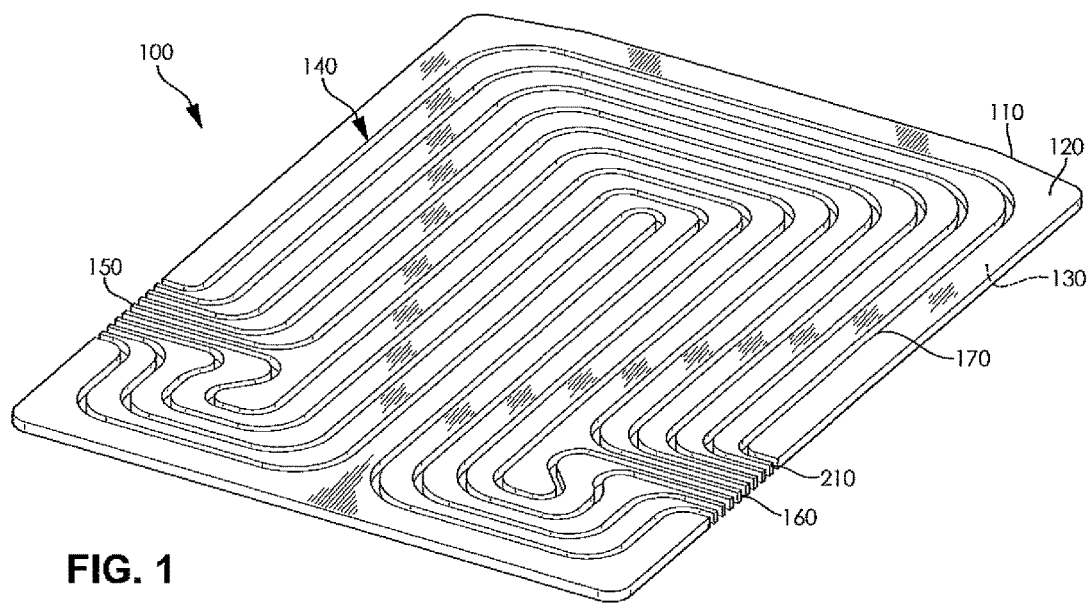
FIG. 1 is a perspective view of an embodiment of a cooling plate according to the present technology.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible. Except where otherwise expressly indicated, all numerical quantities in this description are to be understood as modified by the word "about" in describing the broadest scope of the technology.

The present technology relates to a cooling plate suitable for use in a heat exchanger or temperature regulation system for a battery cell or a battery cell assembly. The cooling plate includes a flow field for circulating a fluid to maintain a particular operating temperature or operating temperature range for one or more battery cells. The cooling plate can be one of a plurality of cooling plates, for example, where each cooling plate can be in thermal contact with a battery cell in a battery cell assembly. Where the battery assembly includes a stack of battery cells, cooling plates can be interleaved with the battery cells. The cooling plate provides a reduction in the number of parts compared to other cooling plates. This allows for fewer joints, seals, and/or seams, which can provide an improved cooling system with respect to ease of construction, weight, and cost.

The battery assembly can be configured to supply high voltage direct current (DC) power to an inverter, which can include a three-phase circuit coupled to a motor to convert the DC power to alternating current (AC) power. In this regard, the inverter can include a switch network having an input coupled to the battery assembly and an output coupled to the motor. The switch network can include various series switches (e.g., insulated gate bipolar transistors (IGBTs)

within integrated circuits formed on semiconductor substrates) with antiparallel diodes (i.e., antiparallel to each switch) corresponding to each of the phases of the motor. The battery assembly can include voltage adaption or transformation, such as DC/DC converters. One or more battery assemblies may be distributed within a vehicle where each battery assembly can be made up of a number of battery cells. The battery cells can be connected in series or parallel to collectively provide voltage to the inverter.

The battery assembly can be cooled by a fluid that flows through a coolant loop including one or more cooling plates. The fluid flows into one or more inlets of the cooling plates in thermal contact with the battery assembly to exchange heat with the battery cells. The fluid then flows through one or more outlets of the cooling plates. The fluid can then be recirculated through the coolant loop. For example, a pump can facilitate the movement of the fluid through the coolant loop. The fluid can be generally referred to as a "coolant," although it should be noted that the coolant may heat or cool various components within the vehicle, including the battery assembly. The coolant can include any liquid that absorbs or transfers heat to cool or heat an associated component, such as water and/or ethylene glycol (i.e., "antifreeze").

Figure 2:
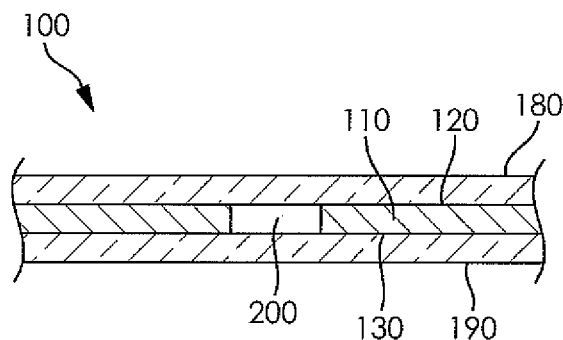
FIG. 2 is a fragmentary cross-sectional view of the embodiment of the cooling plate according to FIG. 1.

Referring to FIGS. 1 and 2, an embodiment of a cooling plate 100 is shown. The cooling plate 100 includes a substantially planar plate 110 having a first surface 120, a second surface 130, and a cutout 140. The cutout 140 includes an inlet 150, an outlet 160, and a flow field 170 between the inlet 150 and the outlet 160. A first film 180 is coupled to the first surface 120 and a second film 190 is coupled to the second surface 130. The flow field 170, the first film 180, and the second film 190 cooperate to form at least one conduit 200 fluidly coupling the inlet 150 and the outlet 160. A plurality of conduits 200 can be defined by the flow field 170, the first film 180, and the second film 190, where the conduits 200 fluidly couple the inlet 150 and the outlet 160. The coupling between the first film 180 and the first surface 120 and the coupling between the second film 190 and the second surface 130 can each be substantially fluid-tight, where the resulting conduit 200 is effectively sealed to prevent leakage of coolant between the respective films 180, 190 and the plate 110.

In the configuration shown in FIGS. 1 and 2, a coolant can flow from the inlet 150 to the outlet 160 through the conduit 200. For example, a cooling system including the cooling plate 100 can use a pump to circulate the coolant (not shown). The conduit 200 follows the flow field 170 portion of the cutout 140. The conduit 200 can include one or more branch points 210 based on the cutout 140 that form multiple conduits 200 between the inlet 150 and the outlet 160. Each of the conduits 200 can further include various intermediate branch points that split into further conduits and/or can include various intermediate coalescing points where multiple conduits coalesce into a fewer number of conduits (not shown). The inlet 150 and the outlet 160 are shown located at an edge of the cooling plate 100 in FIG. 1. However, in other embodiments, the inlet 150 and the outlet 160 can be located at various locations within the cooling plate 100.

In general, the flow field 170 portion of the cutout 140 can be configured to form one or more various pathway shapes and numbers of pathways that cooperate with the first film 180 and the second film 190 to form the conduits 200 of various lengths, dimensions, and branching/coalescing points between the inlet 150 and the outlet 160. In this way, heat exchange of the cooling plate 100 can be symmetric, asymmetric, optimized for a particular region of the, cooling plate 100, or configured to be substantially uniform across the cooling pate 100. Typically, the conduit 200 or the plurality of conduits 200 follow a tortuous path between the inlet 150 and the outlet 160, such as a serpentine path, where the path(s) cover a portion of a surface area of the cooling plate 100.

The cooling plate 100 can be configured to be electrically insulating to prevent electrical current between the coolant and other objects. For example, the cooling plate 100 can be placed in thermal contact with a battery cell by pressing the cooling plate 100 against the battery cell or pressing the cooling plate 100 between two battery cells. In this manner, the electrically insulating cooling plate 100 can prevent electrical current between the coolant and the battery cell(s) as well as prevent electrical current between flanking battery cells. The cooling plate 100 can be electrically insulating through the use of electrically insulating materials for forming the films 180, 190. The substantially planar plate 110 can also be formed of an electrically insulating material. Examples of electrically insulating materials include various polymers; e.g., polypropylene, polyimide, polycarbonate, and the like.

The substantially planar plate 110 can be formed of one or more polymeric materials, including composites and laminated materials. In certain embodiments, the polymeric material can be a member of the group consisting of a silicone, an elastomer, a polyolefin, a polyvinyl chloride, a polystyrene, a polyamide, a polyimide, a polyurethane, a polyester, and combinations thereof. In some embodiments, the polymeric material can include nylon 6,6. In other embodiments, the substantially planar plate 110 is formed of a homogeneous polymeric material that consists of one of the aforementioned polymeric materials.

The first film 180 and the second film 190 can be formed of one or more various materials, including laminated materials. In some embodiments, the first film 180 and the second film 190 can be a resilient or elastomeric material that is capable of substantially returning to its original shape after being stretched or compressed. For example, pressure of a coolant moving through the conduit 200 and/or changes in dimensions of an adjacent battery cell during charging and discharging can impose various forces on the films 180, 190. The resilient material is capable of stretching or compressing in response to such forces. One or both of the first film 180 and the second film 190 can be an adhesive film such as a pressure sensitive adhesive film, a heat activated adhesive film, and/or a UV activated adhesive film, for example. The adhesive capacity of the films 180, 190 can serve to couple the respective film 180, 190 to the respective surface 120, 130 of the substantially planar plate 110. In various embodiments, a separate adhesive can be applied to either of the films 180, 190 and/or the surfaces 120, 130. In still further embodiments, one or both of the films 180, 190 can be adhered to the respective surfaces 120, 130 using other attaching methods, including ultrasonic welding, laser welding, and the like. Examples of materials suitable for the first film 180 and the second film 190 include one or more polyolefins, polyamides, polyurethanes, and polyesters. In certain embodiments, one or both of the first film 180 and the second film 190 can comprise polyethylene terephthalate.

Figure 3:
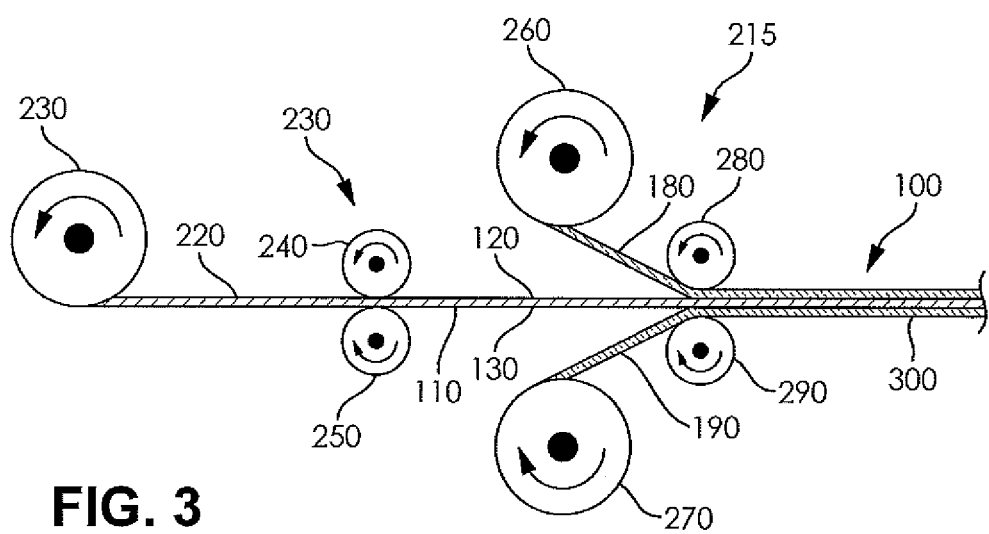
FIG. 3 depicts an embodiment of a method of making a cooling plate according to the present technology.

The present technology further includes various methods of making a cooling plate 100, where one embodiment of a method of making a cooling plate 100 is shown at 215 in FIG. 3. The method 215 includes cutting a blank 220 to form the substantially planar plate 110 having the first surface 120, the second surface 130, and the cutout 140. The cutout 140 includes the inlet 150, the outlet 160, and the flow field 170 between the inlet 150 and the outlet 160. The first film 180 is applied to the first surface 120 and the second film 190 is applied to the second surface 130. The flow field 170, the first film 180, and the second film 190 form at least one of the conduits 200 fluidly coupling the inlet 150 and the outlet 160.

In the embodiment shown at 215 of FIG. 3, the blank 220 is provided as a continuous web from a roll 230 where the blank 220 is cut by a rotary die 230. The rotary die 230 can include a cylindrical die 240 and a cylindrical press 250 that form a nip with the blank 220, cutting the blank 220 to form the cutout 140 in the substantially planar plate 110. Likewise, the first film 180 and the second film 190 are provided as continuous webs from rolls 260, 270 and laminated to the substantially planar plate 110 using rollers 280, 290 to form the cooling plate 100. The cooling plate 100 can be part of a continuous web 300 of cooling plates 100 that are subsequently separated from each other and/or subjected to further processing, including winding onto a roll or other forming or folding operations (not shown). For example, the continuous web 300 of the cooling plates 100 can be subjected to heat and/or UV irradiation to adhere or cure the films 180, 190 to the substantially planar plate 110.

The cutting performed by the rotary die 230 in FIG. 3 can include the use of a steel-rule die, where the cylindrical die 240 is a steel-rule die that cooperates with the cylindrical press 250 to cut the blank 220. Other die cutting means can be used, however, where the rotary die 230 can include a hardened steel die. Other examples include where a linear die cutting press can be substituted for the rotary die 230, where the blank 220 is advanced by a defined register, cut by the linear die cutting press, then a fresh portion of the blank 220 is advanced into the linear die cutting press (not shown). The linear die cutting press can include use of a hardened steel die or a steel-rule die.

As depicted in FIG. 3, the first film 180 and the second film 190 are simultaneously applied to the substantially planar plate 110. Alternatively, the first film 180 and the second film 190 can be sequentially applied to the substantially planar plate 110 (not shown). An adhesive can also be applied to the first surface 120 or the second surface 130 of the substantially planar plate 110 and/or to the first film 180 or the second film 190 prior to the application of the films 180, 190 using the rollers 280, 290 (not shown).

The present technology also includes methods to cool a battery cell. In one such embodiment, the cooling plate 100 is placed in thermal contact with the battery cell, wherein the cooling plate 100 includes the features described herein. A cooling fluid is circulated through the at least one conduit 200 of the cooling plate 100. In this manner, the battery cell can be maintained at a particular operating temperature or temperature range.

Various benefits and advantages are afforded by the present technology. A low cost and low mass cooling plate 100 is provided that is capable of being processed in a simple manufacturing process (e.g., roll-to-roll manufacturing). The cooling plate 100 can also improve voltage isolation compared to other cooling plates, such as metallic cooling plates. Metallic cooling plates, for example, can require brazing or welding during manufacture, where such complexity and additional cost is avoided by the present method of forming the cooling plate 100. When the present cooling plate 100 is used with a stack of battery cells, for example where one or more of the cooling plates 100 are interleaved with the battery cells, the battery cell face pressure in the stack can reduce the load on the films 180, 190 from coolant pressure. In this way, thin cooling plates 100 can be employed, saving space and weight. The weight advantage is even greater in comparison to metallic cooling plates. Likewise, the present cooling plate 100 can be formed of an electrically insulating material to optimize battery cell voltage isolation and reduce or eliminate any electrical current path from cell to cell or from a cell to the coolant. The use of polymeric materials also provides a cost savings versus metals.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A cooling plate comprising:
a substantially planar plate having a first surface, a second surface, and a cutout, the cutout including an inlet, an outlet, and a flow field between the inlet and the outlet;
wherein the inlet and the outlet are disposed on a respective exterior edge surface of the substantially planar plate, between the first surface and the second surface;
a first film coupled to the first surface;
a second film coupled to the second surface, wherein the flow field, the first film, and the second film cooperate to form at least one conduit fluidly coupling the inlet and the outlet; and
wherein the first film includes an adhesive bonding the first film and the first surface of the substantially planar plate together, and the second film includes an adhesive bonding the second film and the second surface of the substantially planar plate together, with the adhesive bond between the first film and the first surface and between the second film and the second surface providing a fluid tight seal therebetween to prevent leakage of coolant between the first film and the first surface of the planar plate, and between the second film and the second surface of the planar plate respectively.

2. The cooling plate of claim 1, wherein the substantially planar plate comprises an electrically insulating material.

3. The cooling plate of claim 1, wherein the substantially planar plate comprises a polymeric material.

4. The cooling plate of claim 3, wherein the polymeric material is a member of the group consisting of a silicone, an elastomer, a polyolefin, a polyvinyl chloride, a polystyrene, a polyamide, a polyimide, a polyurethane, a polyester, and combinations thereof.

5. The cooling plate of claim 3, wherein the polymeric material comprises nylon 6,6.

6. The cooling plate of claim 1, wherein one of the first film and the second film comprises a resilient material.

7. The cooling plate of claim 1, wherein one of the first film and the second film comprises an electrically insulating material.

8. The cooling plate of claim 1, wherein the adhesive film is one of a pressure sensitive adhesive film, a heat activated adhesive film, and a UV activated adhesive film.

9. The cooling plate of claim 1, wherein one of the first film and the second film comprises polyethylene terephthalate.

10. The cooling plate of claim 1, wherein the conduit follows a tortuous path between the inlet and the outlet.

11. The cooling plate of claim 1, wherein the conduit includes at least one branch point.

12. The cooling plate of claim 1, wherein the flow field, the first film, and the second film cooperate to form a plurality of conduits fluidly coupling the inlet and the outlet.

* * * * *